(12) United States Patent
Berreitter et al.

(10) Patent No.: US 12,536,702 B2
(45) Date of Patent: Jan. 27, 2026

(54) SYSTEM AND METHODS FOR LOW POWER ESTIMATION OF BLUE LIGHT EXPOSURE USING A CAMERA INCLUDED IN A USER COMPUTING DEVICE

(71) Applicant: Fitbit LLC, San Francisco, CA (US)

(72) Inventors: Pieris Berreitter, San Francisco, CA (US); Lei Yu, San Diego, CA (US)

(73) Assignee: FITBIT, LLC, San Francisco, CA (US)

( * ) Notice: Subject to any disclaimer, the term of this patent is extended or adjusted under 35 U.S.C. 154(b) by 22 days.

(21) Appl. No.: 18/290,640

(22) PCT Filed: Jul. 19, 2021

(86) PCT No.: PCT/US2021/042207
§ 371 (c)(1),
(2) Date: Jan. 19, 2024

(87) PCT Pub. No.: WO2023/003535
PCT Pub. Date: Jan. 26, 2023

(65) Prior Publication Data
US 2024/0257398 A1 Aug. 1, 2024

(51) Int. Cl.
*G06T 7/90* (2017.01)
*G01J 1/42* (2006.01)
(Continued)

(52) U.S. Cl.
CPC .............. *G06T 7/90* (2017.01); *G01J 1/4204* (2013.01); *G01J 1/44* (2013.01); *H04N 23/71* (2023.01);
(Continued)

(58) Field of Classification Search
CPC ............. G06T 7/90; G06T 2207/10024; G01J 1/4204; G01J 1/44; G01J 2001/444; H04N 23/71; H04N 23/73; H04N 23/88
See application file for complete search history.

(56) References Cited

U.S. PATENT DOCUMENTS 5,289,268 A 2/1994 Suzuki et al.
8,605,167 B2 12/2013 Cote et al.
(Continued)

FOREIGN PATENT DOCUMENTS

CN 106895909 A 6/2017
EP 1950977 B1 6/2010
EP 3038098 6/2016

OTHER PUBLICATIONS

International Search Report for PCT/US2021/042207, mailed on May 9, 2022, 6 pages.
(Continued)

*Primary Examiner* — Nasim N Nirjhar
(74) *Attorney, Agent, or Firm* — DORITY & MANNING P.A.

(57) ABSTRACT

The present disclosure provides computer-implemented methods, systems, and devices for estimation of a user's blue light exposure using the camera of a user computing device. A user computing device captures, using an ambient light sensor, information associated with a light environment of a user computing device. The user computing device determines a target exposure time. The user computing device captures, using a camera, image data by exposing a sensor of the camera to light for a time based on the target exposure time. The user computing device calculates white balance values for the captured image data using an automatic white balance algorithm. The user computing device discards the captured image data. The user computing device generates, based on the automatic white balance values, a blue light exposure value.

20 Claims, 6 Drawing Sheets

(51) Int. Cl.
  *G01J 1/44* (2006.01)
  *H04N 23/71* (2023.01)
  *H04N 23/73* (2023.01)
  *H04N 23/88* (2023.01)
(52) U.S. Cl.
  CPC .............. *H04N 23/73* (2023.01); *H04N 23/88* (2023.01); *G01J 2001/444* (2013.01); *G06T 2207/10024* (2013.01)

(56) References Cited

U.S. PATENT DOCUMENTS

| | | |
|---|---|---|
| 8,964,062 B1 | 2/2015 | Neglur |
| 9,655,525 B2 | 5/2017 | Lee |
| 10,694,091 B2 | 6/2020 | Rees |
| 2010/0157139 A1 | 6/2010 | Velarde et al. |
| 2016/0027282 A1 | 1/2016 | Lee |
| 2016/0047890 A1* | 2/2016 | Ryan ............... H04W 4/02 398/118 |
| 2016/0307541 A1 | 10/2016 | Kagaya et al. |
| 2016/0342874 A1* | 11/2016 | Powell ............. G06K 7/10722 |
| 2017/0318345 A1* | 11/2017 | Branton-Housley .. G09G 5/026 |
| 2018/0137837 A1 | 5/2018 | Peana et al. |
| 2019/0268072 A1* | 8/2019 | Aoyama ............ H04B 10/116 |
| 2021/0065654 A1 | 3/2021 | Peana et al. |
| 2022/0230576 A1* | 7/2022 | Swierk ............... G06F 3/013 |

OTHER PUBLICATIONS

International Preliminary Report on Patentability for Application No. PCT/US2021/042207, mailed Feb. 1, 2024, 8 pages.

\* cited by examiner

SYSTEM AND METHODS FOR LOW POWER ESTIMATION OF BLUE LIGHT EXPOSURE USING A CAMERA INCLUDED IN A USER COMPUTING DEVICE

PRIORITY CLAIM

This application is based upon and claims the right of priority under 35 U.S.C. § 371 to International Application No. PCT/US2021/042207 filed on Jul. 19, 2021, which is incorporated by reference herein.

FIELD

The present disclosure relates generally to blue light exposure estimation using wearable computing systems.

BACKGROUND

User computing devices have increased in processing power and utility. One use for user computing devices is measuring user information about the environment of a user. One example of an element of a user's environment that may be of interest is the amount of blue light that a user is exposed to. However, measuring elements of a user's environment can consume power, which can noticeably shorten the battery life of the device, resulting in a degraded user experience.

SUMMARY

Aspects and advantages of embodiments of the present disclosure will be set forth in part in the following description, or may be learned from the description, or may be learned through practice of the embodiments. One example aspect of the present disclosure is directed to a computer-implemented method for estimating blue light exposure of a user. The method includes determining, by a user computing device including one or more processors, a target exposure time. The method includes capturing, using a camera module of the user computing device, image data by exposing a sensor of a camera to light for a time determined based on the target exposure time. The method includes determining, by the user computing device, automatic white balance values for the captured image data using an automatic white balance algorithm. The method includes discarding, by the user computing device, the captured image data. The method includes generating, by the user computing device and based on the automatic white balance values, a blue light exposure value.

Another example aspect of the present disclosure is directed to a user computing device that includes a camera, an ambient light sensor, an image processing system, and one or more control circuits. The one or more control circuits are configured to determine a target exposure time. The camera can capture image data by exposing a sensor of the camera to light for a time based on the target exposure time. The one or more control circuits can be configured to determine automatic white balance values for the captured image data using an automatic white balance algorithm. The one or more control circuits can be configured to discard the captured image data. The one or more control circuits can be configured to generate, based on the automatic white balance values, a blue light exposure value.

Another example aspect of the present disclosure is directed to a non-transitory computer readable storage medium having computer-readable program instructions embodied thereon that, when executed by one or more processors, cause the one or more processors to capture, using an ambient light sensor, information associated with a light environment of a user computing device. The instructions further cause the one or more processors to determine a target exposure time. The instructions further cause the one or more processors to capture, using a camera, image data by exposing a sensor of the camera to light for a time based on the target exposure time. The instructions further cause the one or more processors to determine automatic white balance values for the captured image data using an automatic white balance algorithm. The instructions further cause the one or more processors to discard the captured image data. The instructions further cause the one or more processors to generate, based on the automatic white balance values, a blue light exposure value.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing touch sensors such as capacitive touch sensors.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1:
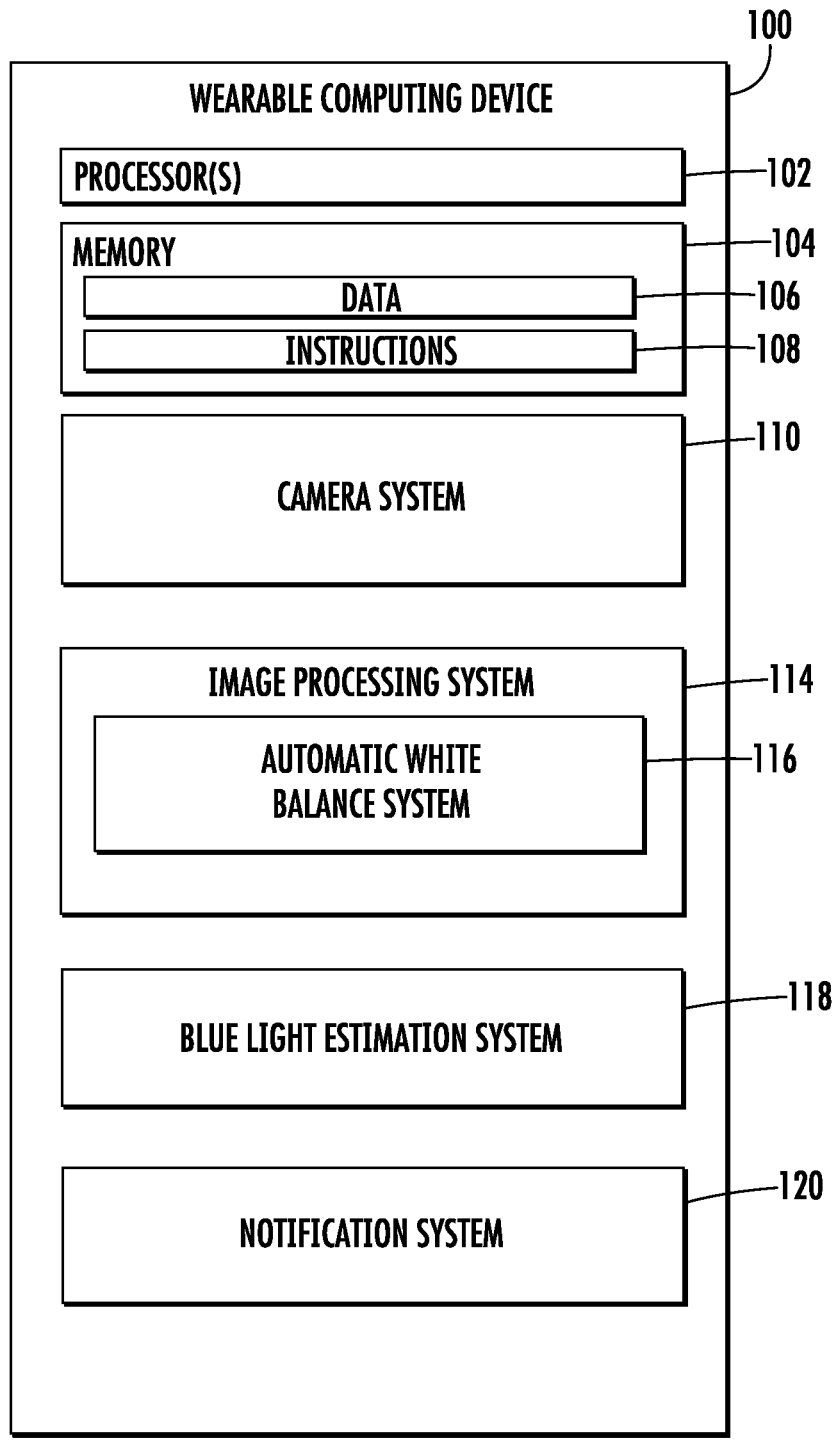
FIG. 1 illustrates an example computing environment including a user computing device in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Generally, the present disclosure is directed towards using a light sensor in a user computing device (e.g., a wearable computing device) to estimate the amount of blue light in a user's environment while using very low power. Blue light has been associated with a variety of health-related effects, such as disrupted sleep patterns and an increased chance of macular degeneration. As a result, users may have an interest in tracking their exposure to blue light. To do so, a blue light detection system can use a camera system included in the user device to capture one or more frames of light data. To capture the correct amount of light data in each frame, the blue light detection system can determine an exposure time for each frame captured by the camera based on an ambient light sensor included in the camera. The camera can have a wide-angle diagonal field-of-view (e.g., greater than 100 degrees) and a frame rate of less than one hertz. Once the exposure time has been determined, the user computing device can capture one image using the camera and provide the image (one frame) to the image processing system within the camera.

The image processing system can execute a plurality of processing steps to convert raw image data into a format that is useful to users. However, not all steps of the image processing system may be useful or necessary for the blue light detection system in all instances. As such, the blue light detection system can employ an automatic white balancing component of the image processing system but not employ other components of the image processing system. For example, the automatic white balancing component can provide gain values for red, green, and blue colored light. Once the gain values have been extracted, the blue light estimation system can discard the captured image data without performing the other steps in the image processing system. In this way, the blue light estimation system can significantly reduce the power use associated with estimating blue light exposure. In some examples, a color other than blue is of interest to the user computing system. Thus, the gain values for green or red may be used to determine red light exposure or green light exposure.

Using the blue light gain values calculated during the automatic white balance step in the image processing system, the blue light estimation process can generate a blue light exposure value. The blue light exposure value can represent the amount of blue light to which a user was exposed. In another example, the blue light exposure value can represent the degree to which the blue light exposure for the user exceeds the expected amount. In some examples, the blue light exposure value can be normalized into a value between 0 and 100. The estimated blue light value can be displayed to a user on a display included in the user computing device (e.g., a display on a smartwatch).

A specific example can include a user computing device (e.g., a smartwatch or fitness band) that a user has throughout the day. The user computing device can include, among other components, a camera, an image processing system, and a blue light estimation system. The user computing device can be configured to estimate the amount of blue light a particular user is exposed to. In some examples, the user computing device can periodically measure the blue light exposure throughout the day to determine an average amount of blue light exposure. Alternatively, the user computing device can be configured to measure the blue light exposure associated with a user at a particular time during the day (e.g., an hour before the user typically sleeps). In this specific example, the user computing device can measure the amount of blue light in a user's environment at a particular moment during the day.

Once the user computing device determines that blue light estimation is to be performed, the user computing device can determine a target exposure time. The exposure time can represent the amount of time that the light sensor associated with the camera captures light data for a particular image. The camera associated with the user computing device can include an ambient light sensor. The ambient light sensor can be used to determine an exposure time for capturing light data for use in estimating blue light exposure. Using the ambient light sensor to determine the exposure time reduces the time to generate a desired exposure time and uses less battery power. Reducing the use of battery power is a significant benefit when using a user computing device operating on battery power. In some examples, the user computing device does not include an ambient light sensor and exposure time is calculated using an autoexposure algorithm.

Once the exposure time has been determined, the user computing device can control the camera to automatically capture light data (e.g., without the user directly controlling the camera). The light data can be used as input to the image processing system. The image processing system can use an automatic white balancing algorithm to extract data representing the gain values for red, green, and blue light. In some examples, the image processing system can extract other values such as the color temperature of a particular image.

Once the blue gains have been determined, the blue light estimation system can discard the light data (e.g., the image data captured by the light sensor) without performing any other steps of the image processing system. In this way, the user computing device can avoid the energy consumption associated with performing the subsequent steps of the image processing system.

The blue light estimation system can estimate a blue light exposure value that represents the amount of blue light that the user has been exposed to. In some examples, the blue light exposure value can be a value between 1 and 100. The blue light exposure value can represent a normalized absolute value of blue light exposure. In another example, the blue light value can represent the amount of blue light exposure that the user of the user computing device has received, relative to an expected value. Once the blue light exposure value has been calculated, the user computing device can present it to the user via a display associated with the user computing device.

More specifically, user computing devices can include, but are not limited to, smartphones, laptops, personal computers, tablet computing devices, smartwatches, fitness bands, computing devices integrated into jewelry such as smart rings or smart necklaces, computing devices integrated into items of clothing such as jackets, shoes, and pants, and wearable glasses with computing elements included therein. In some examples, a user computing device can include a camera device, an image processing system, and a blue light estimation system.

The camera device can capture light data from the area around the camera device and use that data to generate a raw image. In some examples, the camera device included in the user computing device can have a wide-angle lens with a field of view over 100 degrees. Similarly, the camera can have a frame rate of one hertz.

In some examples, the amount of time that the camera device captures light data for a particular image is called the exposure time. The exposure time can be determined based on the amount of light needed to capture a properly lit image.

In some low light environments, the exposure time can be longer, while in environments with a lot of light the exposure time can be shorter. In some examples, the camera device can determine the exposure time based on an auto-exposure algorithm that can include capturing one or more images and successively updating the exposure time until the correct light levels are captured in the image data. Because this process involves capturing a plurality of images and analyzing them to determine their light content, the auto-exposure algorithm can involve a significant amount of power usage and time.

To reduce the amount of power used when estimating the blue light exposure of a particular user, the camera module can determine an exposure time based on an ambient light sensor. The ambient light sensor can be calibrated such that it can estimate a current light environment based on predetermined values associated with the like captured by the ambient light sensor. In this way, the ambient light sensor can quickly and with low power use, determine the appropriate exposure time for the camera at the present moment. In some examples, the ambient light sensor can generate an initial estimate for the exposure time that can be used to determine the exposure time using the successive approximation method more efficiently.

Once the exposure time has been determined, the camera can capture light data for the duration of the determined exposure time. For example, the camera can include a photosensor array including a plurality of pixels. In some examples, each pixel can detect a different color of light. For example, the camera device can include a Bayer filter mosaic over the image sensor to enable the image sensor to capture green, blue, and red light values specifically. Interpolation can be used to determine the color information for the full sensor array and produce red, green, and blue color data for each pixel in the array.

In some examples, the light data can be subsampled or binned. Subsampling can include grouping a plurality of pixels together and determining an average RGB value for the group, rather than calculating different values for each pixel. Subsampling can reduce the number of individual pixel values that must be stored and processed. Doing so reduces the required memory space and the amount of processing power used, thus reducing the total power consumption. However, subsampling can reduce the resolution of the image.

The camera device can pass the captured light data to the image processing system. In some examples, the image processing system includes a plurality of steps. In some examples, the image processing system can include one or more of the following steps: noise reduction, auto-white balancing, color correction, color interpolation, lens shading correction, defect pixel correction, gamma correction, local tone mapping, auto exposure, auto focus, and any other image processing step or technique that can be performed internal to an image processing system.

The image processing system can perform the automatic white balancing step. The automatic white balancing step can include determining gain values for red color, blue color, and green color. Once this step has been performed, the image processing system can discard the image data without performing any other steps. In this way, the image processing system only performs the steps necessary to perform the blue light estimation and reduces power consumption by not performing any other step in the image processing system.

Once the gain values for blue, red, and green light have been calculated, the blue light estimation system can determine a blue light exposure value for the user. In some examples, the gain values for this user can be compared to expected values based on the data of other users and based on the time of day at which the like data was captured. By comparing the gain values for the present user to historic gain values, the blue light estimation system can generate a blue light exposure value. The blue light exposure value can represent the degree to which the user has been exposed to blue light either at a particular moment or throughout a particular time (e.g., an average blue light exposure for the day or week).

In some examples, the blue light estimation system can transmit the blue light exposure value to a display module for display to a user. The blue light exposure value can be displayed directly to the user. In other examples, the notification can include a recommendation that the user reduce their blue light exposure.

The following provides an end-to-end example of the technology described herein. A user computing device can include a camera, an image processing system, and a blue light estimation system. In some examples, the user computing device can be a user computing device. For example, the user computing device can be a smartwatch. In some examples, the camera system can include a wide-angle lens. The field of view for the camera module can be greater than 100 degrees and the frame rate can be less than one hertz.

The user computing device can determine a target exposure time. In some examples, the target exposure time can be based on data received by an ambient light sensor. To do so, the ambient light sensor can collect light data for an amount of time. The ambient light sensor can select a particular light environment from a plurality of possible light environments based on the amount of light data collected by the ambient light sensor in the predetermined amount of time.

In some examples, the particular light environment is selected by matching the amount of light data collected by the ambient light sensor to amounts of light data associated with each light environment in the plurality of possible light environments. For example, the ambient light sensor can access a database that stores data associated with a plurality of possible light environments.

In some examples, the ambient light sensor has been calibrated such that the amount of light data collected in a specific light environment can match the amount of light data previously associated with the specific light environment. Once a predetermined light environment has been selected, the ambient light sensor determines an exposure time based on the selected predetermined light environment.

The camera system can capture image data by exposing a sensor of the camera to light for the target exposure time. In some examples, the camera system can subsample the light data to produce image data with a reduced resolution. Reducing the resolution can reduce the amount of power consumed by the camera. The camera can transmit the light data to the image processing system.

The image processing system can calculate white balance values for the captured image using an automatic white balance algorithm. The white balance values can include values for red, green, and blue light. In some examples, the image processing system uses a multi-step image processing operation to convert the light data captured by the sensor into a viewable image. The image processing system can discard the captured image before completing all the steps of the multi-step image processing operation.

The blue light estimation system can generate, based on the automatic white balance values, a blue light exposure value. In some examples, the blue light exposure value can represent the amount of blue light a user is exposed to relative to other comparable users. The blue light exposure value can be a value between 0 and 100. In some examples, the blue light exposure value can represent a relative amount of blue light to which the user of the user computing device has been exposed to. The user computing device can present the blue light exposure value to the user via a display associated with the user computing device.

Embodiments of the disclosed technology provide a number of technical effects and benefits, particularly in the areas of user computing devices. In particular, embodiments of the disclosed technology provide improved techniques for detecting blue light in the environment of a user automatically and with a minimal amount of power usage. For example, utilizing embodiments of the disclosed technology, a user computing device can more accurately estimate the blue light exposure for a user without significant additional power usage. As such, the disclosed embodiments enable additional functionality without significantly increasing the total cost of a wearable device.

With reference now to the figures, example aspects of the present disclosure will be discussed in greater detail.

FIG. 1 illustrates an example computing environment including a user computing device 100 in accordance with example embodiments of the present disclosure. In this example, the user computing device 100 can include one or more processors 102, memory 104, a camera system 110, an image processing system 114, a blue light estimation system 118, and a notification system 120.

In more detail, the one or more processors 102 can be any suitable processing device that can be embedded in the form factor of a user computing device 100. For example, such a processor can include one or more of: one or more processor cores, a microprocessor, an ASIC, an FPGA, a controller, a microcontroller, etc. The one or more processors can be one processor or a plurality of processors that are operatively connected. The memory 104 can include one or more non-transitory computer-readable storage mediums, such as RAM, ROM, EEPROM, EPROM, flash memory devices, etc., and combinations thereof.

In particular, in some devices, memory 104 can store instructions for implementing the camera system 110, the image processing system 114, the automatic white balance system 116, the blue light estimation system 118, and a notification system 120. The user computing device 100 can implement the blue light estimation system 118 to execute aspects of the present disclosure, including estimating the amount of blue light present in the environment of a user.

It will be appreciated that the term "system" can refer to specialized hardware, computer logic that executes on a more general processor, or some combination thereof. Thus, a system can be implemented in hardware, application specific circuits, firmware and/or software controlling a general-purpose processor. In one embodiment, the system can be implemented as program code files stored on the storage device, loaded into memory, and executed by a processor or can be provided from computer program products, for example computer executable instructions, that are stored in a tangible computer-readable storage medium such as RAM, hard disk or optical or magnetic media.

Memory 104 can also include data 106 and instructions 108 that can be retrieved, manipulated, created, or stored by the one or more processor(s) 102. In some example embodiments, such data can be accessed and used as input to the camera system 110, the image processing system 114, the automatic white balance system 116, blue light estimation system 118, and a notification system 120. In some examples, the memory 104 can include data used to perform one or more processes and instructions that describe how those processes can be performed.

In some examples, the user computing device 100 can include a camera system 110. The camera system 110 can have a wide-angle diagonal field-of-view (e.g., greater than 100 degrees) and a frame rate of less than one hertz. The camera system 110 can include a light detector that can sense when particles of light (e.g., photons) contact it. The light detector can be made of a variety of technologies, including but not limited to: a charged-coupled device (CCD) or a CMOS image sensor. The light sensors can generate electrical signals based on the amount of light that interacts with the sensor. In some examples, the light sensors can include a plurality of pixels, each of which collects light information for a portion of the total light sensor. All the pixels together can form an image. The resolution of a camera can be dependent on, among other things, the number of pixels. In some examples, a Bayer filter can be placed over the light detector. The Bayer filter can filter out certain colors of light two particular pixels. For example, a typical Bayer arrangement can include four colored squares: two green squares, a red square, and a blue square.

In some examples, the camera system 110 can limit the amount of time that the light detector is exposed to light. If no limit is imposed on the exposure time, each pixel would recognize the maximum amount of light (e.g., a bright white value), as a result, no image would be detectable. Thus, by limiting the amount of time in which the light detector is exposed to light, the light detector can capture useful image information. In some examples, the camera device can determine the exposure time based on an auto-exposure algorithm that can include capturing one or more images and successively updating the exposure time until the correct light levels are captured in the image data. Because this process involves capturing a plurality of images and analyzing them to determine their light content, the auto-exposure algorithm can involve a significant amount of power usage and time.

To reduce the amount of power used when estimating the blue light exposure of a particular user, the camera system can include an ambient light sensor. The ambient light sensor can be calibrated such that it can estimate a current light environment based on predetermined values associated with the like captured by the ambient light sensor. In this way, the ambient light sensor can quickly and with low power use, determine the appropriate exposure time for the camera device at the present moment. In some examples, the ambient light sensor can generate an initial estimate for the exposure time that can be used to identify the correct exposure time using the successive approximation method more efficiently.

Once the exposure time has been determined, the camera system 110 can use the light sensor to capture light data for the duration of the determined exposure time. As noted above, because the light sensor can include a Bayer filter mosaic over the image sensor to enable the image sensor to capture green, blue, and red light values for particular pixels, the camera system 110 can use interpolation to determine the color information for the full sensor array and produce red, green, and blue image data for each pixel in the array.

In some examples, the camera system 110 can include a subsampling system. The subsampling system can group a plurality of pixels and determine average RGB values for the group of binned pixels, rather than calculating different values for each pixel. Subsampling reduces the number of individual pixel values that must be stored and processed. Doing so reduces the required memory space and the amount of processing power used, thus reducing the total power consumption. However, subsampling can reduce the resolution of the image.

The camera system 110 can transfer data describing the detected light values to an image processing system 114. In some examples, the image processing system 114 can include a plurality of steps. In some examples, the image processing system 114 can include one or more of the following steps: noise reduction, auto-white balancing, color correction, color interpolation, lens shading correction, defect pixel correction, gamma correction, local tone mapping, auto exposure, auto focus, and any other image processing technique that can be performed internal to an image processing system 114. Thus, the image processing system can include an automatic while balance system 116.

The automatic white balance system 116 can perform an automatic white balancing of the image received from the light detector. To white balance an image, the automatic white balance system 116 can estimate the temperature of the light in the image (e.g., the characteristics of the light that is illuminating the scene). The automatic white balance system 116 can determine how to adjust the red, green, and blue values within the image based on the determined temperature of the light. For example, the automatic white balance system 116 can generate gain values (adjustment values) for red light, green light, and blue light.

Once the gain values for blue, red, and green light have been calculated by the automatic white balance system 116, the blue light gain values can be transmitted to the blue light estimation system 118.

In some examples, the blue light estimation system 118 can transmit the blue light exposure value to a notification system 120. The notification system 120 can cause a display associated with the user computing device 100 to display the blue light exposure value to a user. In some examples, the blue light exposure value can be displayed directly to the user. In other examples, the notification system 120 can generate a notification that includes a recommendation that the user reduce their blue light exposure.

Figure 2:
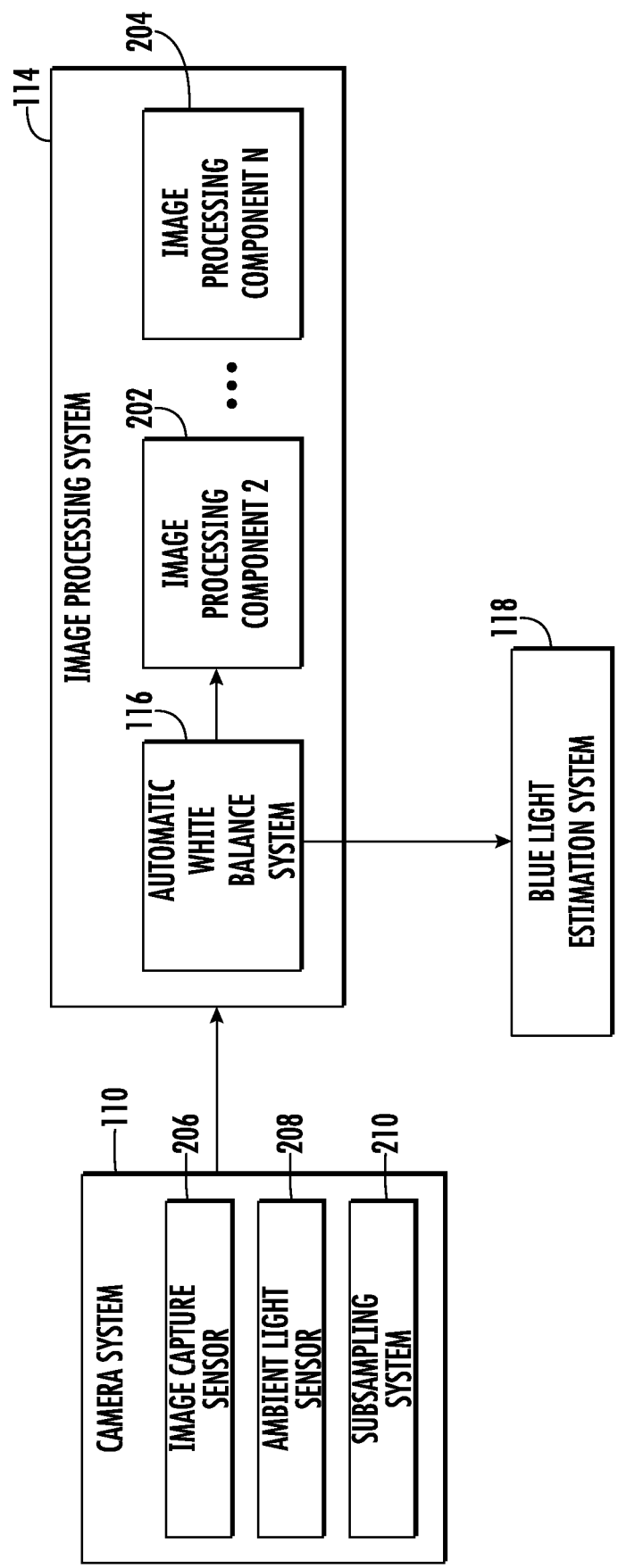
FIG. 2 illustrates an example system for estimating blue light exposure blue in accordance with example embodiments of the present disclosure.

FIG. 2 illustrates an example system 200 for estimating blue light exposure in accordance with example embodiments of the present disclosure. The system 200 can include a camera system 110, an image processing system 114, and a blue light estimation system 118.

The camera system 110 can include an image capture sensor 206, an ambient light sensor 208, and a subsampling system 210. The image capture sensor 206 can include a light detector that can sense when particles of light (e.g., photons) contact it. In some examples, the image capture sensor 206 can include a plurality of pixels in a grid array, each of which collects light information for a portion of the total light sensor. All the pixels together can form an image. This image can be transmitted to the image processing system 114. To get the best possible image, the camera system 110 can limit the amount of time that the light detector is exposed to light. This can be referred to as the exposure time. As noted above, the camera system 110 can determine the exposure time based on an auto-exposure algorithm that can include capturing one or more images and successively updating the exposure time until the correct light levels are captured in the image data. Because this process involves capturing a plurality of images and analyzing them to determine their light content, the auto-exposure algorithm can involve a significant amount of power usage and time.

To reduce the amount of power used when estimating the blue light exposure of a particular user, the camera system 110 can include an ambient light sensor 208. The ambient light sensor can be calibrated such that it can estimate a current light environment based on predetermined values associated with the like captured by the ambient light sensor 208. In this way, the ambient light sensor 208 can quickly and with low power use, determine the appropriate exposure time for the camera device at the present moment. In some examples, the ambient light sensor 208 can generate an initial estimate for the exposure time that can be used to determine the exposure time using the successive approximation method more efficiently.

Once the exposure time has been determined, the camera system 110 can use the image capture sensor 206 to capture light data for the duration of the determined exposure time. As noted above, because the light sensor can include a Bayer filter mosaic over the image sensor array grid to enable the image sensor to capture green, blue, and red light values for particular pixels, the camera can use interpolation determine the color information for the full sensor array grid and produce red, green, and blue image data for each pixel in the array.

In some examples, the camera system 110 can include a subsampling system 210. The subsampling system 210 can group a plurality of pixels together and determine average RGB values for the group of binned pixels, rather than calculating different values for each pixel. Subsampling reduces the number of individual pixel values that must be stored and processed. Doing so reduces the required memory space and the amount of processing power used, thus reducing the total power consumption. However, subsampling can reduce the resolution of the image.

Once light data has been captured by the camera system 110, the light data is passed through an image processing system 114 that takes raw image data or light data and processes it to generate an image appropriate for display to a user. The image processing system 114 can include a plurality of components to implement a plurality of image processing steps. In some examples, the image processing system 114 can one or more of the following steps: noise reduction, auto-white balancing, color correction, color interpolation, lens shading correction, defect pixel correction, gamma correction, local tone mapping, auto exposure, auto focus, and any other image processing technique that can be performed internal to an image processing system 114.

The plurality of components in the image processing system 114 can include an automatic white balance system 116, an image processing component 2 202, and one or more further image processing components (see image processing component N 204). The automatic white balance system 116 can perform an automatic white balancing of the image received from the light detector. To white balance an image, the automatic white balance system 116 can estimate the temperature of the light in the image (e.g., the characteristics of the light that is illuminating the scene). The automatic white balance system 116 can determine how to adjust the red, green, and blue values within the image based on the determined temperature of the light. For example, the automatic white balance system 116 can generate gain values (adjustment values) for red light, green light, and blue light.

Once the gain values for blue, red, and green light have been calculated by the automatic white balance system 116, the image processing system 114 can discard the image data and not engage the other steps of the image processing system 114 (e.g., image processing component 2 202 and image processing component N 204).

The blue light gain value can be transmitted from the automatic white balance system 116 to the blue light estimation system 118. Using the blue light gain values, the blue light estimation system 118 can determine a blue light value for the user. In some examples, the gain values for this user can be compared to expected values based on the data of other users and based on the time of day at which the like data was captured. By comparing the gain values for the present user to historic gain values, the blue light estimation system 118 can generate a blue light exposure value. The blue light exposure value can represent the degree to which the user has been exposed to blue light either at a particular moment or throughout a particular time (e.g., an average blue light exposure for a week or a month).

Figure 3:
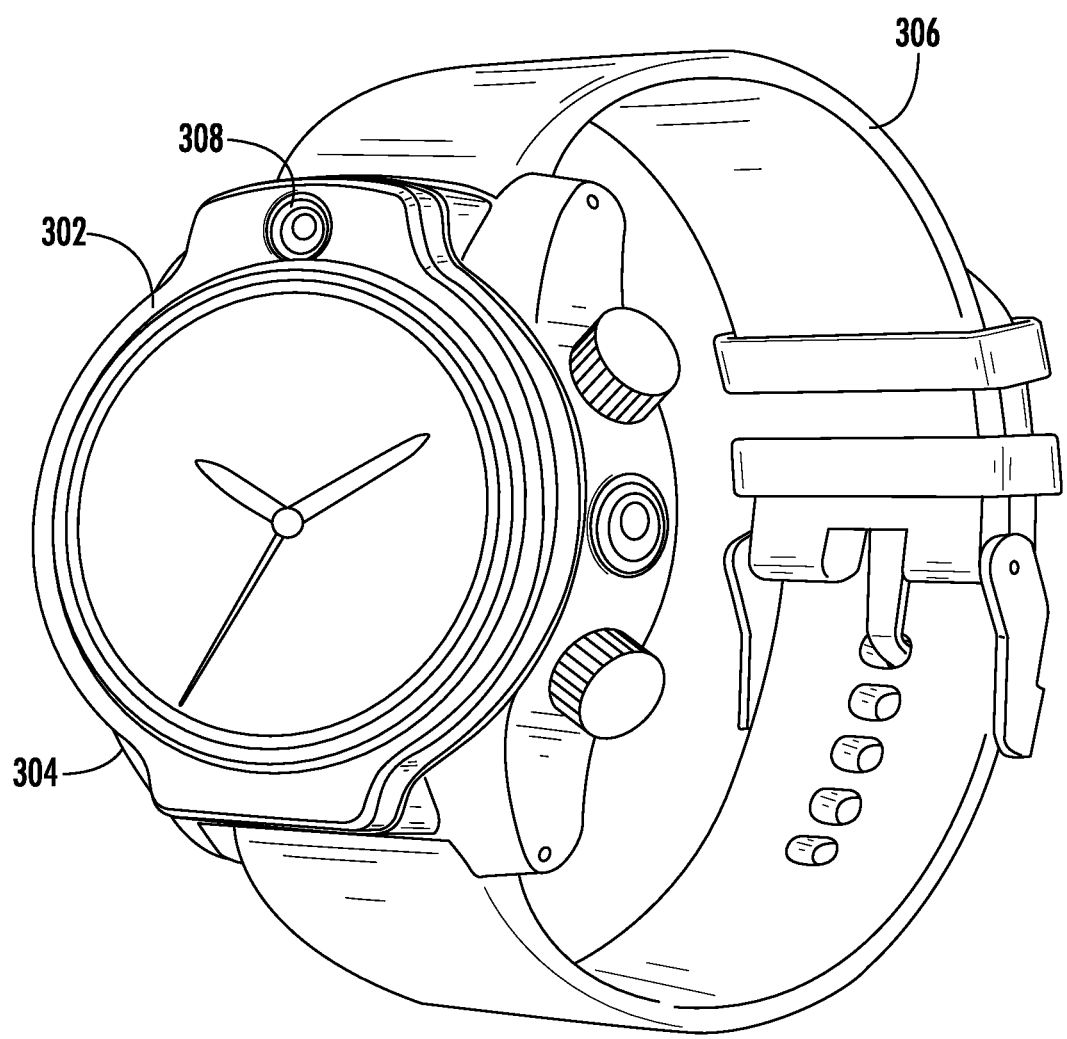
FIG. 3 depicts the front view of an example wearable device according to example embodiments of the present disclosure.

FIG. 3 depicts the front view of an example wearable device 300 according to example embodiments of the present disclosure. In an embodiment, the wearable device 300 may be a wristband, a bracelet, a wristwatch, an armband, a ring placed around a digit of the user, or other wearable products that may be equipped with sensors as described in the present disclosure. In an embodiment, the wearable device 300 is configured with a display 302, a device housing 304, a band 306, and a camera 308. In an embodiment, the display 302 can be configured to present a variety of data including data associated with the current time including one or more real clock hands and/or simulated clock hands, user data relating to the user's skin temperature, heart rate, electroencephalograms, electrocardiograms, electromyography, electrooculograms, and other physiological data of the user (e.g., blood oxygen level), and any other data. The display 302 can also be configured to convey data from additional ambient sensors contained within the wearable device 300. Example information conveyed on the display 302 from these additional ambient sensors can include a positioning, altitude, and weather of a location associated with the user. The display 302 can also convey data regarding the motion of the user (e.g., whether the user is stationary, walking, and/or running).

In an embodiment, the display 302 can be configured to receive data input by the user. In an embodiment, a user can, by input on the display, request that the wearable computing device 300 generate additional data for display to the user (e.g., electrocardiogra data).

In an embodiment, the device housing 304 can be configured to contain one or more processors and the camera system described in the present disclosure. The device housing 304 can also include other sensors. Example sensors contained by the device housing 304 can include skin temperature sensors, internal device temperature sensors, location sensors (e.g., GPS), motions sensors, altitude sensors, heart rate sensors, audio sensors, pressure sensors, and other physiological sensors (e.g., blood oxygen level sensors). In an embodiment, the device housing 304 can also be configured to include one or more processors. The band 306 can be configured to secure the wearable device 300 around an arm the user by, for example, connecting ends of the band 306 with a buckle, clasp, or other similar securing devices, thereby allowing the wearable device 300 to be worn by the user.

The camera 308 can include a wide-angle lens with a field of view over 100 degrees. Similarly, the camera 308 can have a frame rate of one hertz. The camera 308 can capture light data and use it to estimate the user's exposure to blue light.

Figure 4:
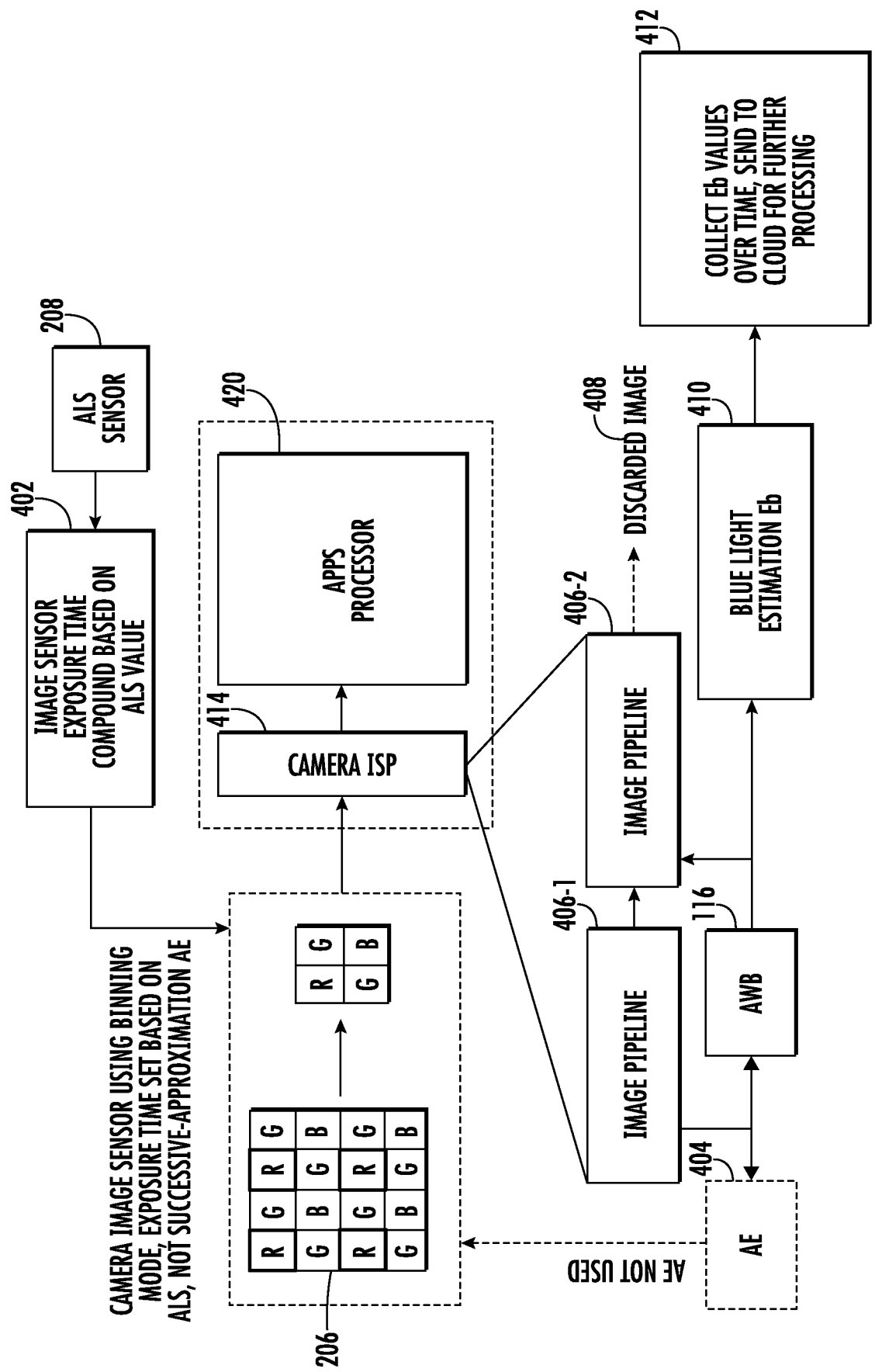
FIG. 4 illustrates an example camera system in accordance with example embodiments of the present disclosure.

FIG. 4 illustrates an example camera system 400 in accordance with example embodiments of the present disclosure. The camera system 400 can include an image capture sensor 206, a camera image signal processor 414, and one or more processors 420. The image capture sensor 206 can include a priority of pixels, each pixel having an associated Bayesian filter color. The colors can include blue, red, and green. The light values captured by the image capture sensor 206 can be combined such that the average value of multiple different pixels can be combined into a single pixel value (referred to as subsampling or binning). Doing so reduces the total amount of data and also reduces the resolution of the image. Reducing the number of pixels and the resolution can result in a reduced amount of work needed to process the image data by the image signal processor and one or more processors included in the camera system 400. The exposure time 402 can be determined based on an ambient light sensor 208 and/or using an autoexposure algorithm 404.

Once the image capture sensor 206 has captured the image data based on light received by the image capture sensor 206, the image can be transferred to the camera image signal processor. The camera image signal processor can be used to convert the received image data from raw values to be ready for display on a screen to a user.

To do so, the camera image signal processor 414 can include an image operation with a plurality of image operation steps (406-1, 406-2, and so on). In some examples, the first step in the image operation processing step is the automatic white balance system 116. As noted above, the automatic white balance system 116 can determine, for a particular image, a color temperature. Based on the color temperature determine adjustment values for red colors, green colors, and blue colors. The adjustment values can be referred to as gains.

Once the gain values are determined, the camera image signal processor 414 can discard the remaining image data 408. In this way, the other steps of the image operation are not committed and the amount of power needed is reduced. The blue gain value (e.g., the amount that the colors in the image are to be adjusted relative to blue) can be passed to the blue light estimation system 410. In some examples, the blue light estimation system for 10 can determine four a particular day or time the amount of blue light present in an environment.

The blue light estimation system 410 can pass the estimated blue light values to a cloud system 412 wherein the blue light values will be collected, compared, and further processed. For example, the estimated blue light exposure values can be compared to estimated blue light exposure values from other users to determine whether the user of the camera 400 has been exposed to an above average amount of blue light. Similarly, blue light values for a user can be collected over a period of time to determine whether or not the user is exposed to excessive amounts of blue light frequently.

Figure 5:
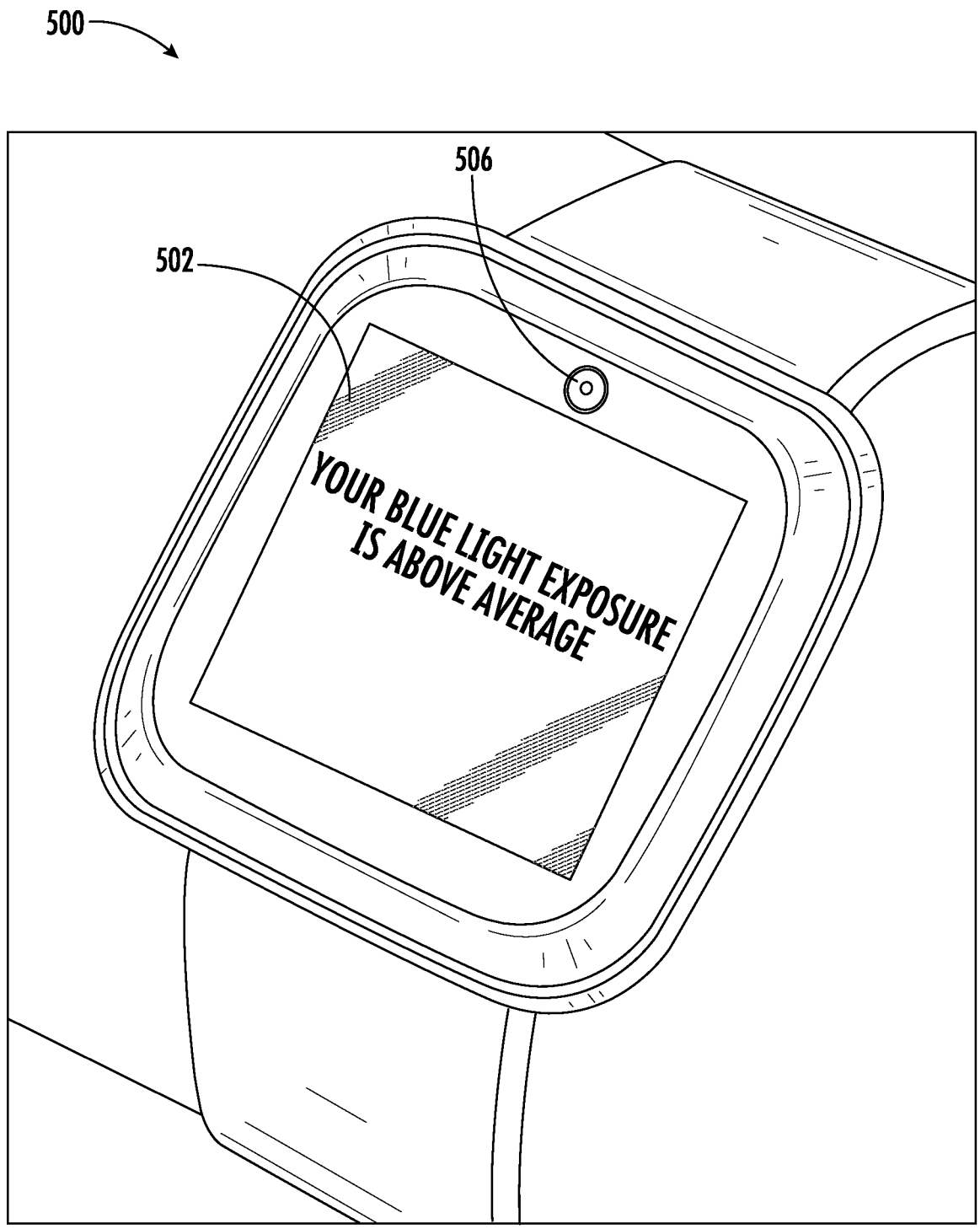
FIG. 5 illustrates an example user interface for a smartwatch in accordance with example embodiments of the present disclosure.

FIG. 5 illustrates an example user interface for a smartwatch 500 in accordance with example embodiments of the present disclosure. In this example, a smartwatch 500 includes a display 502. In addition, the smartwatch includes a camera 506. The smartwatch 500 can, using the camera and based on the environment of the camera, estimate the amount of blue light a user has been exposed to. The smartwatch 500 can display a message on the display associated with the amount of blue light the user has been exposed to. The message can include an estimated level of blue light estimation. In addition, the message can be a recommendation to move to an environment with less blue light exposure.

Figure 6:
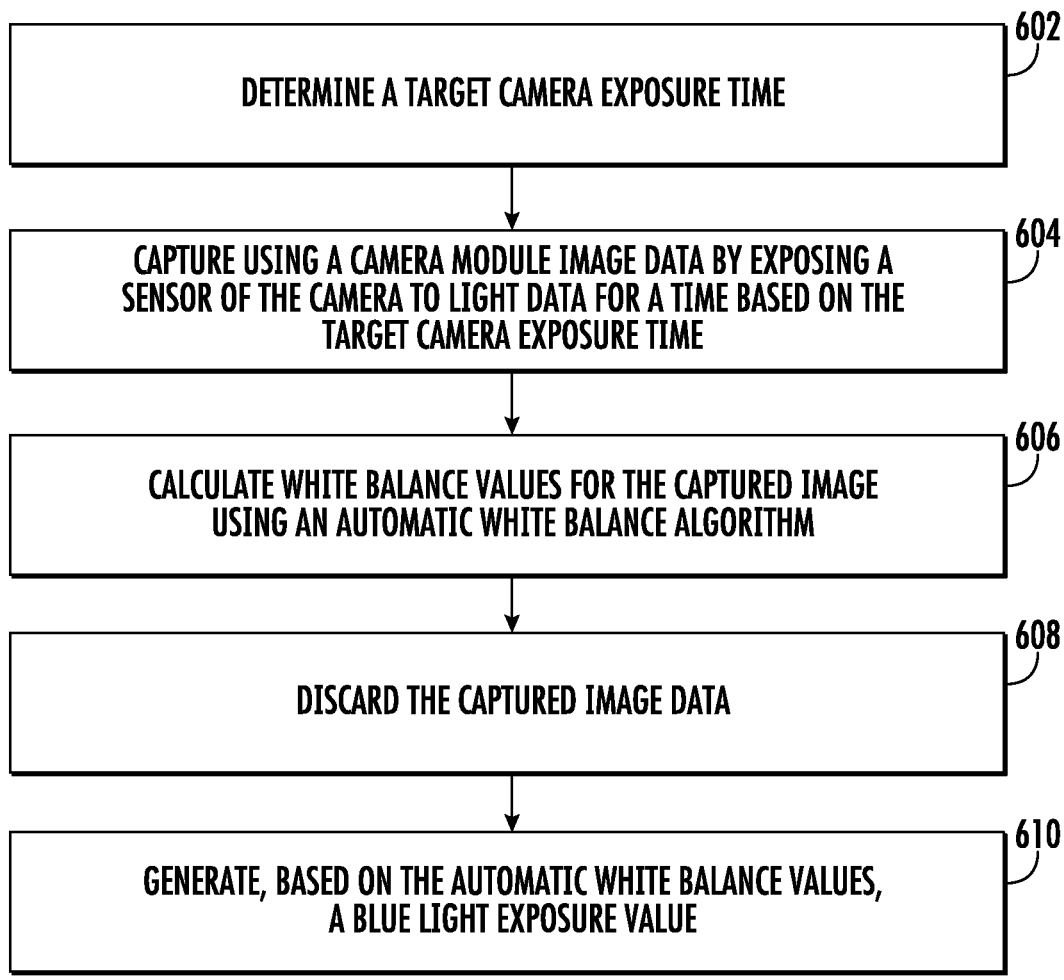
FIG. 6 is a flowchart depicting an example process of detecting blue light exposure in accordance with example embodiments of the present disclosure.

FIG. 6 is a flowchart depicting an example process of detecting blue light exposure in accordance with example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-3.

A user computing device (e.g., user computing device 100 in FIG. 1) can include a camera (e.g., camera system 110 in FIG. 1), an image processing system (e.g., image processing system 114 in FIG. 1), and a blue light estimation system (e.g., blue light estimation system 118 in FIG. 1). In some examples, wherein the user computing device 100 is a user computing device. For example, the user computing device 100 can be a smart watch. In some examples, the camera system 110 can include a wide-angle lens. In some examples, the field of view for the camera module is greater than 100 degrees and the frame rate is less than one hertz.

The user computing device 100 can, at 602, determine a target exposure time. In some examples, the target exposure time is based on data received by an ambient light sensor (e.g., ambient light sensor 208 in FIG. 2). To do so, the ambient light sensor 208 can collect light data for an amount of time. The ambient light sensor 208 can select a particular light environment from a plurality of possible light environments based on an amount of light data collected by the ambient light sensor in the predetermined amount of time.

In some examples, the particular light environment is selected by matching the amount of light data collected by the ambient light sensor 208 to amounts of light data associated with each light environment in the plurality of possible light environments. For example, the ambient light sensor 208 can access a database that stores data associated with a plurality of possible light environments.

In some examples, the ambient light sensor 208 can be calibrated such that the amount of light data collected in a specific light environment will match the amount of light data previously associated with the specific light environment. Once a predetermined light environment has been selected, the ambient light sensor 208 can determine, based on the selected light environment an exposure time based on the selected predetermined light environment.

The camera system 110 can, at 604, capture image data by exposing a sensor of the camera to light for a time based on the target exposure time. In some examples, the camera system 110 can subsample the light data to produce image data with a reduced resolution. Reducing the resolution can reduce the amount of power consumed by the camera system 110. The camera system 110 can transmit the light data to the image processing system 114.

The image processing system 114 can, at 606, calculate white balance values for the captured image using an automatic white balance algorithm. The white balance values can include values for red, green, and blue light. In some examples, the image processing system 114 uses a multi-step image processing operation to convert the light data captured by the sensor into a viewable image. In some examples, the image processing system 114 can, at 608, discard the captured image before completing all the steps of the multi-step image processing operation.

In some examples, the blue light estimation system 118 can, at 610, generate, based on the automatic white balance values, a blue light exposure value. In some examples, the blue light exposure value can represent the amount of blue light a user is exposed to relative to other comparable users. The blue light exposure value can be a value between 0 and 100. The blue light exposure value can represent a relative amount of blue light to which the user of the user computing device has been exposed to. The user computing device 100 can present the blue light exposure value to the user via a display associated with the user computing device.

The technology discussed herein refers to sensors and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for estimating blue light exposure of a user, the method comprising:
   determining, by a user computing device including one or more processors, a target exposure time;
   capturing, using a camera module of the user computing device, image data by exposing a sensor of a camera to light for a time determined based on the target exposure time;
   determining, by the user computing device, automatic white balance values for the captured image data using an automatic white balance algorithm;
   after determining the automatic white balance values for the captured image data and prior to displaying the image data, discarding, by the user computing device, the captured image data; and
   generating, by the user computing device and based on the automatic white balance values, a blue light exposure value.

2. The computer-implemented method of claim 1, wherein the target exposure time is based on data received by an ambient light sensor.

3. The computer-implemented method of claim 2, wherein determining, by the user computing device, a target exposure time further comprises:
   collecting, by the ambient light sensor, light data for an amount of time;

selecting, by the ambient light sensor, a particular light environment from a plurality of possible light environments based on an amount of light data collected by the ambient light sensor in the amount of time; and determining, by the ambient light sensor, an exposure time based on the selected particular light environment.

4. The computer-implemented method of claim 3, wherein the particular light environment is selected by matching the amount of light data collected by the ambient light sensor to a respective amount of light data associated with each light environment in the plurality of possible light environments.

5. The computer-implemented method of claim 4, further comprising calibrating the ambient light sensor such that the respective amount of light data collected in a specific light environment will match the respective amount of light data previously associated with the specific light environment.

6. The computer-implemented method of claim 1, wherein the camera module uses a multi-step image processing operation to convert the light data captured by the sensor into a viewable image, and the captured image data is discarded before completing all of a plurality of steps of the multi-step image processing operation.

7. The computer-implemented method of claim 1, wherein the white balance values include values for red, green, and blue light.

8. The computer-implemented method of claim 1, wherein the blue light exposure value represents an amount of blue light a user is exposed to.

9. The computer-implemented method of claim 1, wherein the user computing device is a user computing device.

10. The computer-implemented method of claim 9, wherein the user computing device is a smart watch.

11. The computer-implemented method of claim 1, wherein the camera module includes a wide-angle lens.

12. The computer-implemented method of claim 1, wherein camera module has a field of view greater than 100 degrees and operates at a frame rate of less than one Hertz.

13. The computer-implemented method of claim 1, wherein the blue light exposure value is a value between 0 and 100.

14. The computer-implemented method of claim 1, further comprising:
presenting, by the user computing device, a notification according to the blue light exposure value via a display associated with the user computing device.

15. The computer-implemented method of claim 1, further comprising:
subsampling, by the user computing device, the data captured by the sensor of the camera to produce image data with a reduced resolution.

16. A user computing device comprising:
a camera;
an ambient light sensor;
an image processing system; and
one or more control circuits to:
determine a target exposure time;
capture, using the camera, image data by exposing a sensor of the camera to light for a time based on the target exposure time;
determine automatic white balance values for the captured image data using an automatic white balance algorithm;
after determining the automatic white balance values for the captured image data and prior to displaying the image data, discard the captured image data; and
generate, based on the automatic white balance values, a blue light exposure value.

17. The user computing device of claim 16, wherein the target exposure time is based on data received by the ambient light sensor.

18. A non-transitory computer readable storage medium having computer-readable program instructions embodied thereon that, when executed by one or more processors, cause the one or more processors to:
capture, using an ambient light sensor, information associated with a light environment of a user computing device;
determine a target exposure time;
capture, using a camera, image data by exposing a sensor of the camera to light for a time based on the target exposure time;
determine automatic white balance values for the captured image data using an automatic white balance algorithm;
after determining the automatic white balance values for the captured image data and prior to displaying the image data, discard the captured image data; and
generate, based on the automatic white balance values, a blue light exposure value.

19. The computer-implemented method of claim 1, wherein determining, by the user computing device, automatic white balance values for the captured image data using an automatic white balance algorithm further comprises:
determining, by the user computing device, a color temperature of the captured image data.

20. The computer-implemented method of claim 1, wherein determining, by the user computing device, automatic white balance values for the captured image data using an automatic white balance algorithm further comprises:
comparing, by the user computing device, the color temperature of the captured image data to a reference color temperature; and
determining, by the user computing device, gain values for blue, red, and green light based on the comparison of the color temperature of the captured image data to a reference color temperature.

* * * * *